(12) United States Patent
Czerwinski et al.

(10) Patent No.: US 7,487,454 B2
(45) Date of Patent: Feb. 3, 2009

(54) MANAGING ARBITRARY WINDOW REGIONS FOR MORE EFFECTIVE USE OF SCREEN SPACE

(75) Inventors: Mary Czerwinski, Woodinville, WA (US); Brian Meyers, Issaquah, WA (US); Desney S. Tan, Pittsburgh, PA (US); George G. Robertson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 610 days.

(21) Appl. No.: 10/832,478

(22) Filed: Apr. 26, 2004

(65) Prior Publication Data

US 2005/0240873 A1    Oct. 27, 2005

(51) Int. Cl.
*G06F 3/00* (2006.01)
(52) U.S. Cl. .................................. 715/751; 715/759
(58) Field of Classification Search ................. 715/769, 715/800, 801, 804, 740, 751, 759
See application file for complete search history.

(56) References Cited

U.S. PATENT DOCUMENTS

| 5,802,531 | A * | 9/1998 | Lamiraux et al. | 715/202 |
| 5,983,268 | A * | 11/1999 | Freivald et al. | 709/218 |
| 6,538,660 | B1 * | 3/2003 | Celi et al. | 345/592 |
| 2002/0129054 | A1 * | 9/2002 | Ferguson et al. | 707/503 |
| 2003/0112273 | A1 * | 6/2003 | Hadfield et al. | 345/751 |
| 2004/0194026 | A1 * | 9/2004 | Barrus et al. | 715/515 |
| 2004/0221232 | A1 * | 11/2004 | Morgan | 715/530 |
| 2005/0007297 | A1 * | 1/2005 | Bhogal et al. | 345/1.1 |
| 2005/0138554 | A1 * | 6/2005 | Bell et al. | 715/530 |
| 2005/0223343 | A1 * | 10/2005 | Travis et al. | 715/862 |

OTHER PUBLICATIONS

Bly, S.A., and J.K. Rosenberg, "A Comparison of Tiled and Overlapping Windows," *Proceedings of Conference on Human Factors in Computing Systems (CHI '86)*, Association for Computing Machinery / Special Interest Group on Computer-Human Interaction (ACM/SIGCHI), Boston, Apr. 13-17, 1986, pp. 101-106.

Hutchings, D.R., and J. Stasko, "New Operations for Display Space Management and Window Management," *Georgia Institute of Technology Technical Report GIT-GVU-02-18*, Atlanta, Aug. 2002, pp. 1-20.

Kandogan, E., and B. Shneiderman, "Elastic Windows: Evaluation of Multi-Window Operations," *Proceedings of Conference on Human Factors in Computing Systems (CHI '97)*, Association for Computing Machinery / Special Interest Group on Computer-Human Interaction (ACM/SIGCHI), Atlanta, Mar. 22-27, 1997, pp. 250-257.

(Continued)

*Primary Examiner*—Dennis Bonshock
(74) *Attorney, Agent, or Firm*—Amin, Turocy & Calvin, LLP

(57) ABSTRACT

The present invention enables the management of arbitrary regions of a window. A surrogate window is created to contain a region of interest in a source window. A surrogate window may also be shared among multiple devices. A user may interact with the content in a source window or its surrogate window(s). A surrogate window is updated to reflect any content change in the region of interest in the source window. In the case that a user resizes a surrogate window, the entire content of the surrogate window is scaled accordingly so the entire content remains visible.

28 Claims, 9 Drawing Sheets

OTHER PUBLICATIONS

Li, D., and R. Li, "Transparent Sharing and Interoperation of Heterogeneous Single-User Applications," *Proceedings of Conference on Computer-Supported Collaborative Work (CSCW '02)*, ACM Special Interest Groups on Supporting Group Work (SIGGROUP) and Computer-Human Interaction (SIGCHI), New Orleans, Nov. 16-20, 2002, pp. 246-255.

Myers, B.A., "A Taxonomy of Window Manager User Interfaces," *IEEE Computer Graphics & Applications 8*(5):65-84, Sep. 1988.

Richardson, T., et al., "Virtual Network Computing," *IEEE Internet Computing 2*(1):33-38, Jan.-Feb. 1998.

Smith, G., et al., "GroupBar: The TaskBar Evolved," *Proceedings of Australian Computer Human Interaction Conference (OZCHI '03)*, Brisbane, Australia, Nov. 26-28, 2003, 10 pages.

Stille, S., et al., "An Adaptive Window Management System," *Proceedings of the 6th IFIP Conference on Human Computer Interaction (Interact '97)*, Sydney, Australia, Jul. 14-18, 1997, 3 pages.

Wickens, C.D., and C.M. Carswell, "The Proximity Compatibility Principle: Its Psychological Foundation and Relevance to Display Design," *Human Factors 37*:3, 473-494, Sep. 1995.

\* cited by examiner

MANAGING ARBITRARY WINDOW REGIONS FOR MORE EFFECTIVE USE OF SCREEN SPACE

FIELD OF THE INVENTION

In general, the present invention relates to a computer program, and in particular, to a computer program that manages the use of screen space.

BACKGROUND OF THE INVENTION

The display screen for window based computer programs can be divided into several windows. Each window either contains different kinds of information, such as text, graphics, and video, or provides another view of the same information. Usually, a window based operating system is in place to control how the windows look and act. The window based operating system provides ways for a user to manage the windows, like moving, hiding, resizing, iconizing, or closing windows. A window based operating system also decides which window at the moment accepts input from a user and which window is on the top of all other windows.

Currently, there are two major ways window based operating systems display windows: Overlapping window displays and tiled window displays. FIG. 1A illustrates an example of an overlapping window display 100. An overlapping window display 100 allows a window to be partially or totally located on top of (overlap) another window. For example, in FIG. 1A, window II 102 partially covers window I 104 on the display screen 106 that is hosted by the computer 108. An overlapping window display 100 allows a user to manage a window's location and size in any way the user wants. Therefore, the user controls the use of the screen space and the visibility of window contents. However, it requires a user to exert considerable effort in managing the windows. For example, when a user changes a window to a smaller size, some content in the window will be hidden. If a user is interested in a particular hidden content, the user may need to use the scroll bar on the sides of the window to search for the content of interest every time the user resizes a window.

FIG. 1B illustrates one example of a tiled window display 150. A tiled window display 150 determines the size and the location of all windows such that each window is always completely visible. No windows are allowed to overlap. For example, in FIG. 1B, window I 152, window II 154, window III 156, and window IV 158 are laid out in a two by two column/row matrix on the display screen 160 that is hosted by a computer 162. The contents of these four windows are fully visible and there is no overlapping among these four windows. The window based operating system that controls a tiled window display 150 may attempt to manage window locations, sizes, and side effects to maximize the use of the screen space while keeping window contents visible. When the location and/or size of a window changes, other windows are relocated and resized as needed, but never obscured. A tiled window display 150 is desirable when the window based operating system picks arrangements that meet the needs of a user. However, it restricts a user's ability to move windows and change window size when the arrangement chosen by the window based operating system does not support the task the user wants to perform.

Studies suggest that a window display created by an ideal window based operating system should require a user to exert only the least amount of effort necessary to manage the windows. Such a window display also should ensure that information is laid out in a manner that best supports the tasks at hand. For example, information that is relevant should be displayed close together. Current window based operating systems such as those that create overlapped window displays and tiled window displays do not meet these requirements. They fail to address certain user needs, which are discussed below.

At times, a user may be interested in managing only the smaller portions or regions of a window. For example, a user may want to use only the graphical chart embedded in a financial document. Such smaller portions or regions of a window are herein called regions of interest. A user may want to use or interact with the content in a region of interest by itself, i.e., by copying this region of interest on the original window into another existing window. Further, the user may want to synchronize the content in the new window with that in the original window. However, with conventional window based operating systems such as those that control overlapped window displays and the tiled window displays, a user can be required to manually copy and paste a region of interest from the original window to a new window, also manually created by the user. In addition, with conventional window based operating systems, there is no provision for synchronizing content in the new window with content in the original window. In addition, a user may prefer to spatially reorganize information. For example, a user may want to use the least amount of screen space available to keep herself abreast of updating information by monitoring peripheral awareness tasks, such as time of day or stock tickers. Hence, there is a need for a system and a method that allow a user to conveniently manage and spatially arrange smaller regions of a window in order for the user to perform certain tasks more efficiently.

Further, there is a need for a system and a method that allow a user to view and operate on smaller portions of a window across multiple devices. This need arises for individual users working on multiple devices. Such a user may want to annex display space available to this user by sharing an arbitrary region of a window on one device with another device. This need can also arise for a group of users working together, each with personal devices. For example, multiple users with their personal devices may need to share a common visual space to discuss projects located on each of the personal devices. The personal devices can be the users' laptops, and the common visual space can be a visual projector. Each of the users may want to share different portions of a window on their personal devices at the common visual space. Currently, when sharing a common visual space, users have to view the contents of one user's personal device at a time. Alternatively, to view all of the material together, users could either print out relevant material or combine it on a single computer. This is not optimal handling of the situation, especially when the material is dynamic and cannot be determined beforehand, requires live editing, or is interspersed with private information that the author does not wish to share.

In summary, as the above discussion shows, there is a need for a system and a method that allow users to conveniently manage smaller regions of a window. There is also a need for a system and a method that allow users to share smaller regions of a window across multiple devices. The present invention is directed to addressing these needs.

SUMMARY OF THE INVENTION

The present invention addresses the above-identified needs by providing a method, a computer-readable medium containing computer-executable instructions, and a computer system for improving the management of arbitrary regions of a window.

In accordance with the present invention, when a user specifies a region of interest in a window (called a source window), a surrogate window containing the region of interest is created. A user may interact with the surrogate window or the source window. Preferably, any change in the content of the region of interest in the source window is replicated in the surrogate window containing the region of interest.

Another aspect of the present invention enables the sharing of surrogate windows across multiple computers. More specifically, in accordance with other aspects of the present invention, a surrogate window can be duplicated to form a remote surrogate window on the display screen of another computer, in addition to the surrogate window displayed on the display screen of the computer displaying the source window (i.e., the local surrogate window). In one aspect of the present invention, a user can interact with content in any of the windows—the remote surrogate, the local surrogate or the source window. In another aspect of the present invention, any change in a region of interest in the source window will be replicated in the surrogate window(s) containing the region of interest. In a further aspect of the present invention, a remote surrogate window can be managed from the computer containing the source window and the local surrogate window.

In summary, the present invention provides a method, a computer-readable medium containing computer-executable instructions, and a computer system for improving the management of arbitrary regions of a window on a computer, local to the computer or across multiple computers. Embodiments of the present invention provide more efficient use of available screen space, and better organization of information associated with performing a task.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention relates to a method, a computer-readable medium containing computer-executable instructions, and a computer system for allowing users to replicate arbitrary regions of existing windows into surrogate windows. Another aspect of the present invention relates to allowing users to share surrogate windows across multiple devices. The content in a surrogate window is a live representation of the content in the region of interest in the source window. In the case that a surrogate window is resized, the content in the surrogate window is scaled so that the entire content in the surrogate window remains completely visible. Embodiments of the present invention allow users to better utilize available screen space and better organize information associated with a task.

Figure 1A:
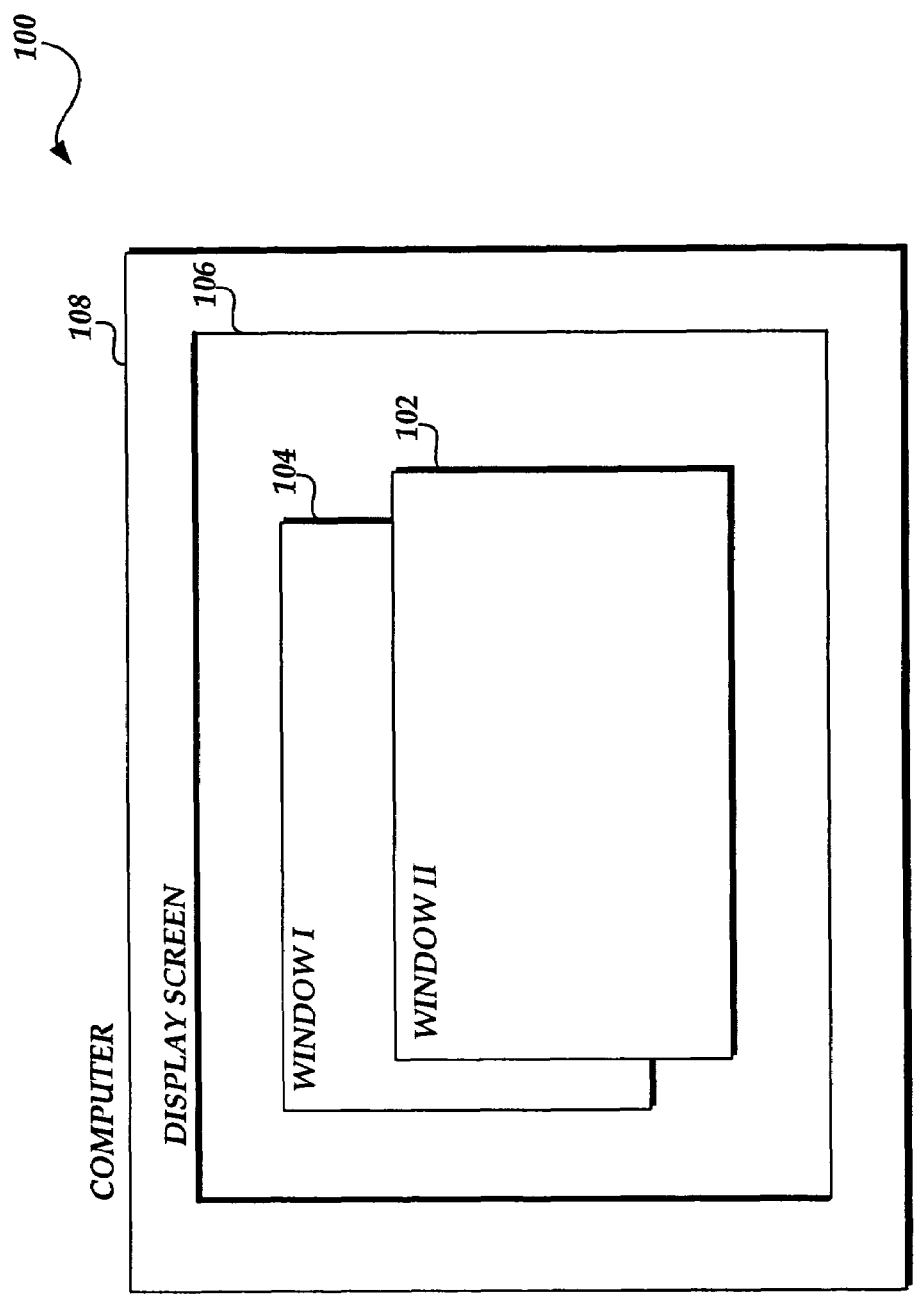
FIGS. 1A-1B are block diagrams illustrating two conventional window displays, namely an overlapping window display and a tiled window display.
Figure 1B:
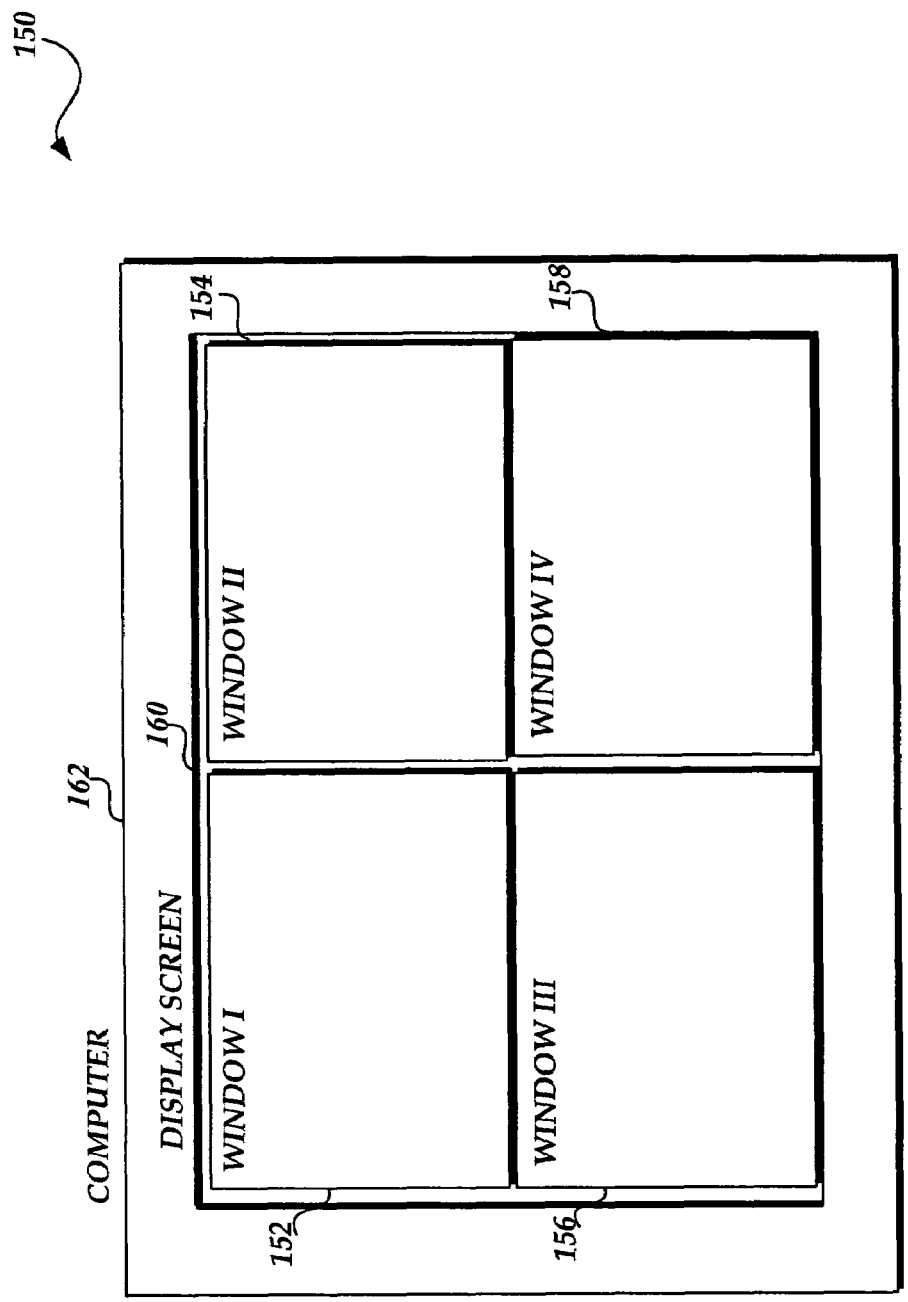
Figure 2:
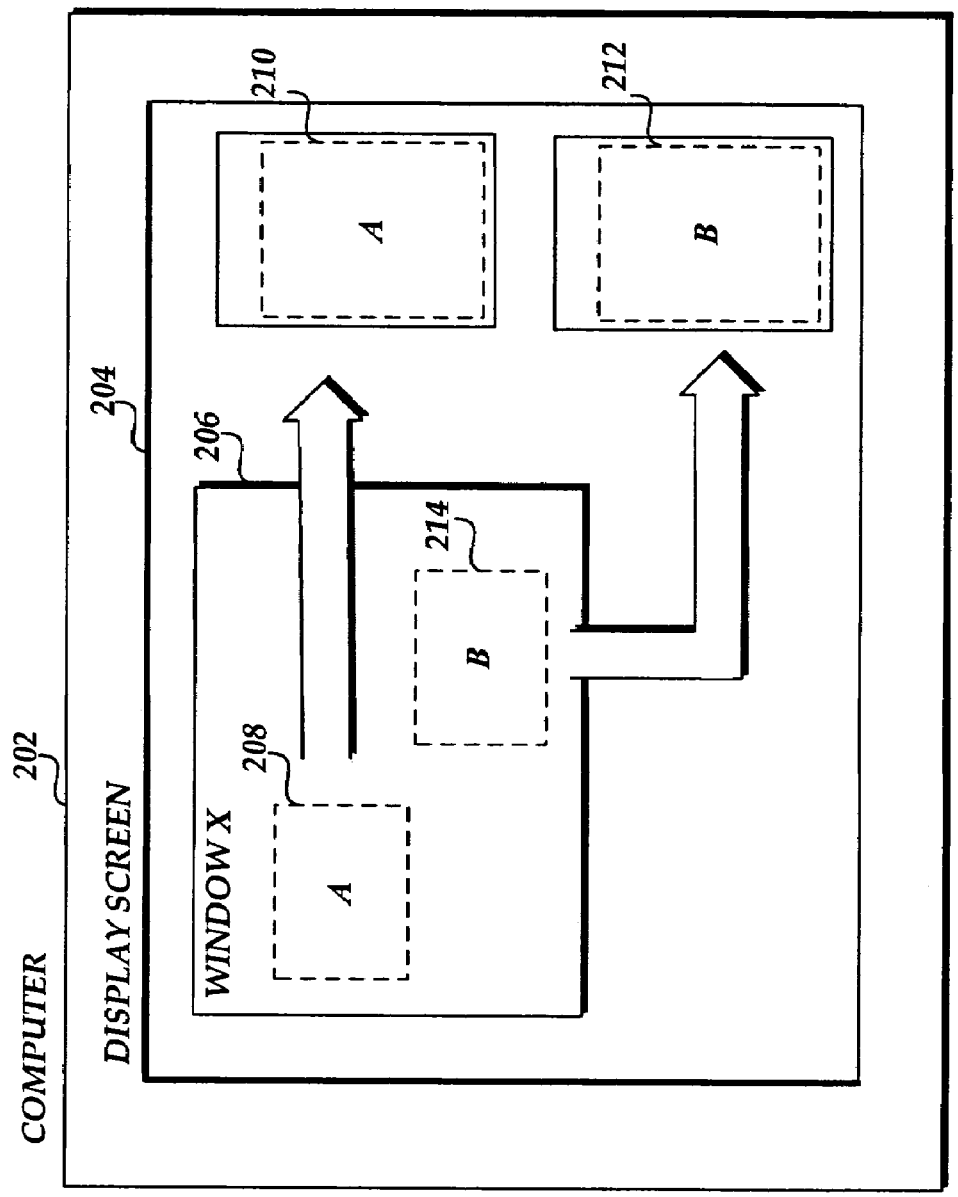
FIG. 2 is a block diagram illustrating one embodiment of the present invention, namely two surrogate windows, each containing a region of interest taken from a source window.
Figure 5:
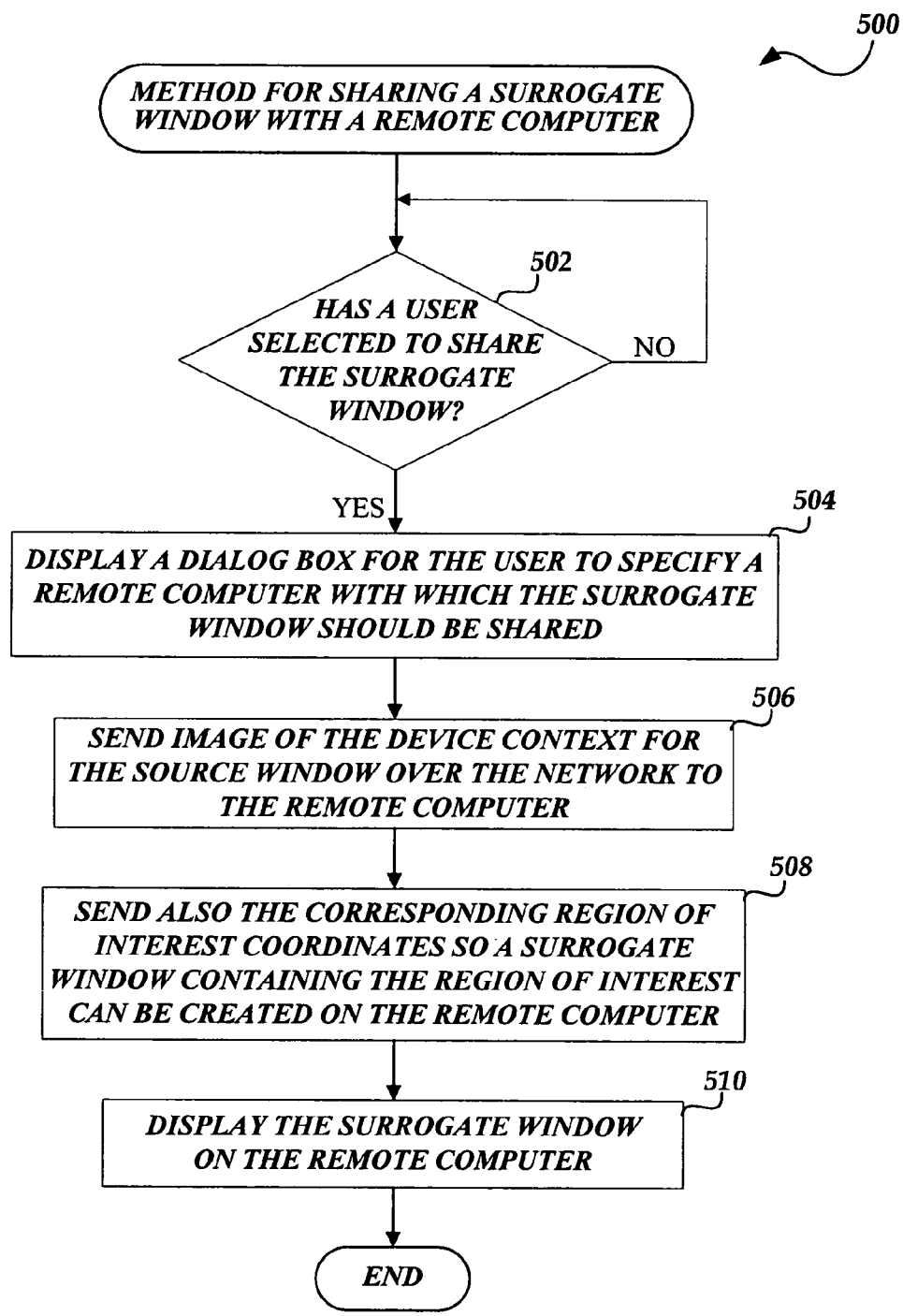
FIG. 5 is a process diagram illustrating an exemplary method of sharing a surrogate window with a remote computer.

FIG. 2 illustrates one exemplary embodiment of the present invention, wherein surrogate windows containing regions of interest in a source window are created. More specifically, FIG. 2 illustrates a window X 206 displayed on the display screen 204 of a host computer 202. The window X 206 contains a region of interest A 208 that a user may be interested in duplicating in a surrogate window. By way of example only, in order to create a surrogate window 210 that contains the region of interest A 208, a user may need to activate a surrogate window enabler. The activation of a surrogate window enabler allows a user to start defining a region of interest. The deactivation of an activated surrogate window enabler after its activation disables the user's ability to define a region of interest. In some embodiments of the present invention, a surrogate window enabler is a predefined keyboard modifier combination. An example of a keyboard modifier combination is CTRL-"~", which is the actuation of the CTRL key together with the accent-grave (~) key. In other embodiments of the present invention, a surrogate window enabler can be a menu item, which could be selected to allow a user to begin the process of defining a region of interest. A user's ability to define a region of interest is terminated as soon as the menu item is deselected. In yet another embodiment of the present invention, a surrogate window enabler is a list of the available source windows. The display of the list allows a user to select the source window based on its title. The invisibility of the list disables a user's ability to select a source window. In this approach, upon a user selecting a source window, the entire window becomes the region of interest. This approach is particularly useful for quickly sharing an entire source window with a remote computer. A method of sharing of a surrogate window with a remote computer is illustrated by FIG. 5 and will be discussed in more detail later.

In one exemplary embodiment of the invention, the activation of a surrogate window enabler creates a semi-transparent tint over the entire display screen 204. The user then clicks and drags a mouse cursor over a portion of window X 206 to specify a rectangular region of interest A 208. A user may define one region of interest as many times as the user prefers, as long as the surrogate window enabler is activated. When a user finishes defining the region of interest A 208, the user deactivates the surrogate window enabler. The semi-transparent tint over the display screen 206 disappears and a new surrogate window 210 appears. Window X 206, the source window of the new surrogate window 210, is unaffected.

In one exemplary embodiment of the present invention, a new surrogate window appears on top of its source window, slightly offset from the location of the region of interest. In another exemplary embodiment of the present invention, surrogate windows are differentiated from regular windows by a green dotted line around the content region of the surrogate windows.

A user may make as many surrogate windows as the user wishes, either from a single source window, or from multiple source windows. For example, as shown in FIG. 2, a user may create another surrogate window 212 containing a region of interest B 214 on the window X 206.

As shown in FIG. 2, in the present invention, each surrogate window 210, 212 is a separate window. As a separate window, each surrogate window can be managed much like a regular window. In one exemplary embodiment of the present invention, a surrogate window can show up in the Microsoft Windows® taskbar. A surrogate window can also be minimized, restored, resized, moved, and closed. Further, the content in the surrogate window is defined by what exists in the region of interest in the source window, and not by some region of the display screen. As a result, a user can move and even hide the source window without affecting the content in the surrogate window.

When a user resizes a surrogate window, the present invention preserves the visibility of the entire content in the surrogate window by scaling the content accordingly. This allows a user to make content in a surrogate window fill as little or as much space as the user prefers. In one exemplary embodiment of the present invention, menu functions are provided that allow a user to return the content in a surrogate window to its original size or to constrain its aspect ratio.

In some embodiments of the present invention, a surrogate window is read-only. In such embodiments of the invention, aside from, from example, minimizing, restoring, resizing, moving, and closing a surrogate window, a user may not interact directly with content in the surrogate window.

Additionaly, in some embodiments of the present invention, a surogate window always contains a live representation of the content that appears within the corresponding region of interest in the source window. Content within the surrogate window is always updated to reflect any changes made to the content in the corresponding region of interest in the source window. Thus, a user can view updated content from the source window through the surrogate window. In one embodiment of the present invention, if a source window is closed, its surrogate windows can remain open, but only in a read-only mode.

In one embodiment of the present invention, a surrogate window observes its source window. If the surrogate window can determine when the content of the source window has been changed, the surrogate window updates itself. If it is not possible to for the surrogate window to detect changes, the surrogate window updates its own contents periodically. By way of example, based on system resources and needs, a surrogate window may be updated at the rate of twice a second when the surrogate window has the focus, i.e., it is listening to keyboard inputs. The surrogate window may stop updating itself if it is not visible.

Figure 3:
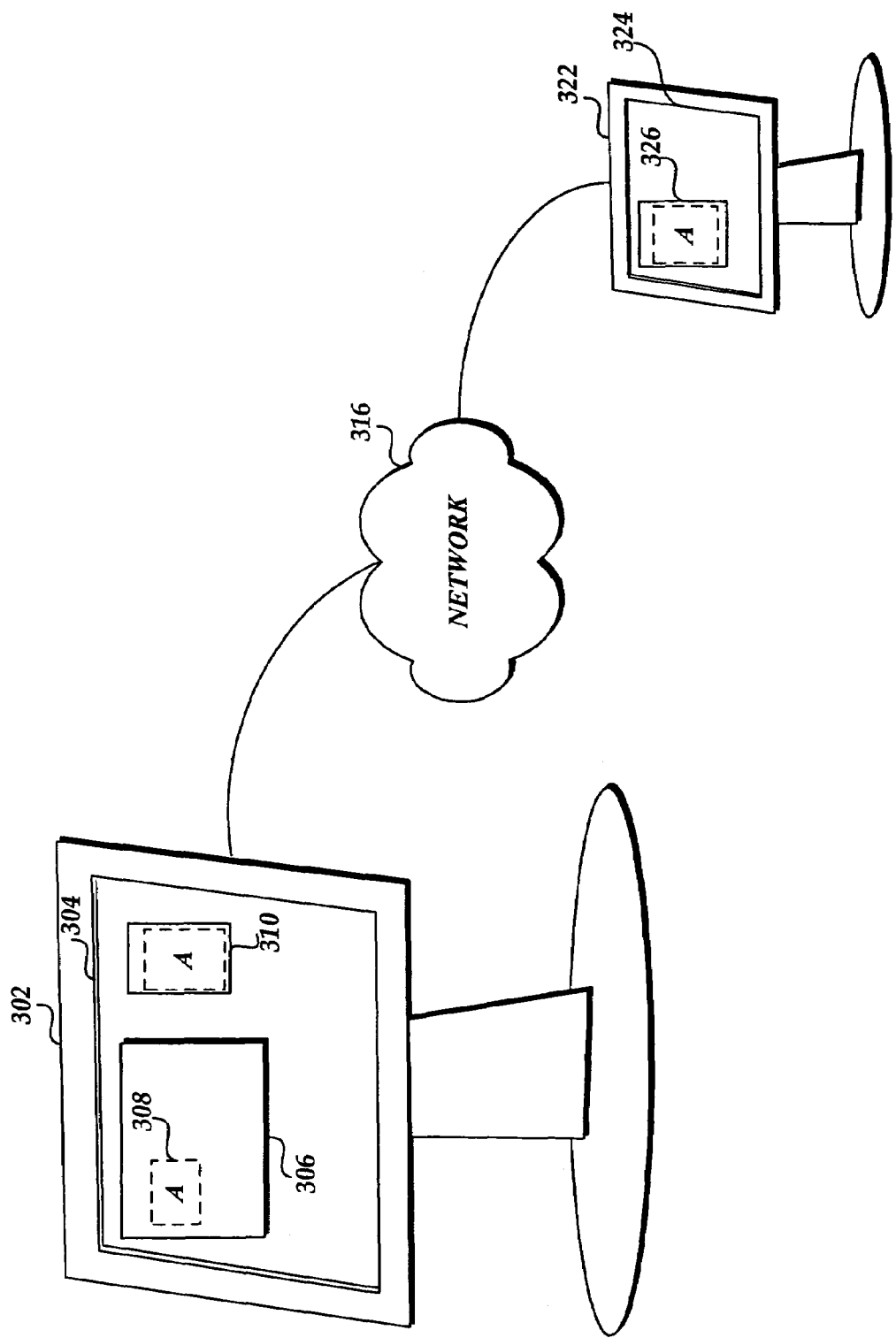
FIG. 3 is a block diagram illustrating another aspect of the present invention, namely, a surrogate window being shared across multiple devices.

Some embodiments of the present invention also allow a user to share surrogate windows containing regions of interest in a source window across multiple devices. FIG. 3 illustrates the sharing of a surrogate window across two computers. More specifically, FIG. 3 illustrates a source window 306 in the display screen 304 of a source computer 302. A surrogate window 310 that contains a region of interest A 308 in the source window 306 is also displayed on the display screen 304 of the source computer 302. The surrogate window 310 can also be called a local surrogate window because it is displayed on the display screen 304 where its source window 306 is displayed as well. In one exemplary embodiment of the present invention, in order to share a surrogate window 310 with a remote computer 322, a user clicks on a "share" button (not shown) in a menu bar associated with the surrogate window 310. A dialog box is displayed that allows the user to specify the remote computer 322 with which the user wishes to share the surrogate window 310. Alternative embodiments of the present invention allow the user to specify the name and/or the IP address of the remote computer 322. Information concerning the surrogate window 310 is then sent to the remote computer 322 via a network 316 connecting the source and remote computers. A remote surrogate window 326 is then created on the display screen 324 of the remote computer 322. FIG. 5, which will be discussed in detail later, illustrates an exemplary method of sharing a surrogate machine on a source computer across a remote computer. Alternative embodiments of the present invention provide for simultaneously sending and receiving surrogate windows to and from multiple computers.

In some embodiments of the present invention, a remote surrogate window 326 is read-only. By way of example only, the read-only status of the content of remote surrogate window 326 on a remote computer 322 can be designated by a red dotted line around the content.

Even though the content of the remote surrogate window 326 can be designated read-only, a user can interact with the source window 306 on the source computer 302. When this occurs, the relevant content is updated on the remote surrogate window 326 on the remote computer 322.

If desired, a user can manage a remote surrogate window 326, for example, by minimizing, restoring, resizing, moving, or closing the remote surrogate window 326, from the source computer 302. In one example of such an embodiment of the present invention, management of a remote surrogate window 326 can be achieved by managing the corresponding local surrogate window 310 and have the relevant changes be updated to the remote surrogate window 326. Thus, for example, a user can resize and/or position a local surrogate window 310 and have the resulted changes be updated to a remote surrogate window 326. In another example of such an embodiment of the present invention, managing a remote surrogate window 326 on the display screen 324 of a remote computer 322 is accomplished by coupling the corresponding local surrogate window 310 on the source computer 302 to a program that implements an input redirection mechanism. Such an input redirection mechanism redirects the input stream over the network 316 so that a user can use input devices connected to the source computer 302, such as a mouse and/or keyboard, to control the input on the remote computer 322. In exemplary embodiments of the present invention, a program implementing such an input redirection mechanism can be activated by the user moving the cursor off a pre-defined edge of the original display screen 304 or by the user actuating a hot key that is associated with the program. The program then enables the user to take control of the cursor on the remote display screen 324. In this way, a user can easily use the mouse connected to the source computer to manage surrogate windows on a remote computer.

As will be readily appreciated from the foregoing description, the invention is directed to providing users with tools for improving the effective spatial organization of information when there is limited screen space or to improve efficiency by only showing window regions that are of particular interest for monitoring updates or otherwise. At its core, embodiments of the present invention provide a mechanism for a user to specify relevant regions of information contained in a window (source window) to create a surrogate window and use standard window management techniques to organize and display the information in the surrogate window.

Embodiments of the present invention can also be very useful for monitoring peripheral awareness tasks. In these tasks, users try to keep abreast of frequently updated information using the least amount of screen space possible. For example, a user may want a small view of a clock program on a display screen to keep the user aware of current time. Similarly, a user may want to view a few selected stock tickers from a financial Web page to keep the user abreast of the performance of these stocks. Embodiments of the present invention allow users to readily specify the region of interest in a document, scale the resulting surrogate window to an appropriate size, and move it to an appropriate location on the display screen.

Embodiments of the present invention also can be used as a rapid interface prototyping tool. For example, a user can create an entire interface by making surrogate windows of various regions of the interface and then exploring how various regions of an interface will appear when laid out in different ways by scaling and rearranging the surrogate windows. A user can also explore focus-in-context and fish-eye views in a rapid manner by creating multiple but adjacent surrogate windows and scaling them to different degrees. In the past, these actions could take much longer prototyping or development effort.

Figure 7:
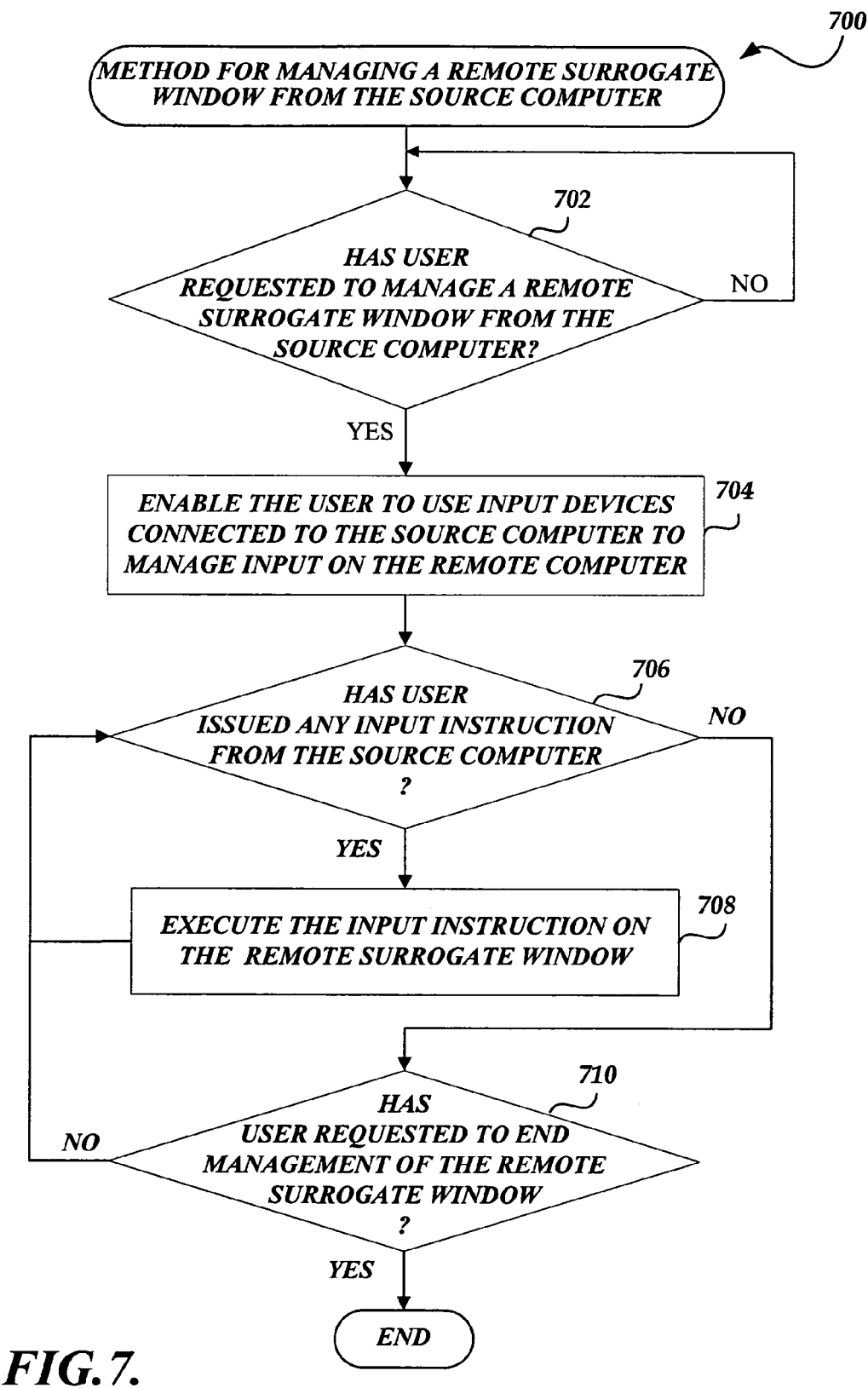
FIG. 7 is a process diagram illustrating an exemplary method of managing a remote surrogate window from the computer hosting the source window.

Sharing surrogate windows across multiple computers allows users to easily exchange updates of relevant information. Users can share surrogate windows containing the relevant information and edit the source window on their respective source computers. The inclusion of a shared display, such as a projected display, allows multiple users to send their surrogate windows to a location where multiple others simultaneously have a view of the shared information. Some embodiments of the present invention allow users to manage surrogate windows on the shared display from their respective source computers. FIG. 7, which will be discussed in detail later, illustrates an exemplary method of allowing a user to manage a remote surrogate window from its source computer.

Embodiments of the present invention also allow users to annex display space offered by various devices on their desktops. For example, users can send surrogate windows containing peripheral awareness tasks onto the display screen of their laptop rather than allowing the surrogate windows to take up valuable screen space on their main computer display screen.

Figure 4A:
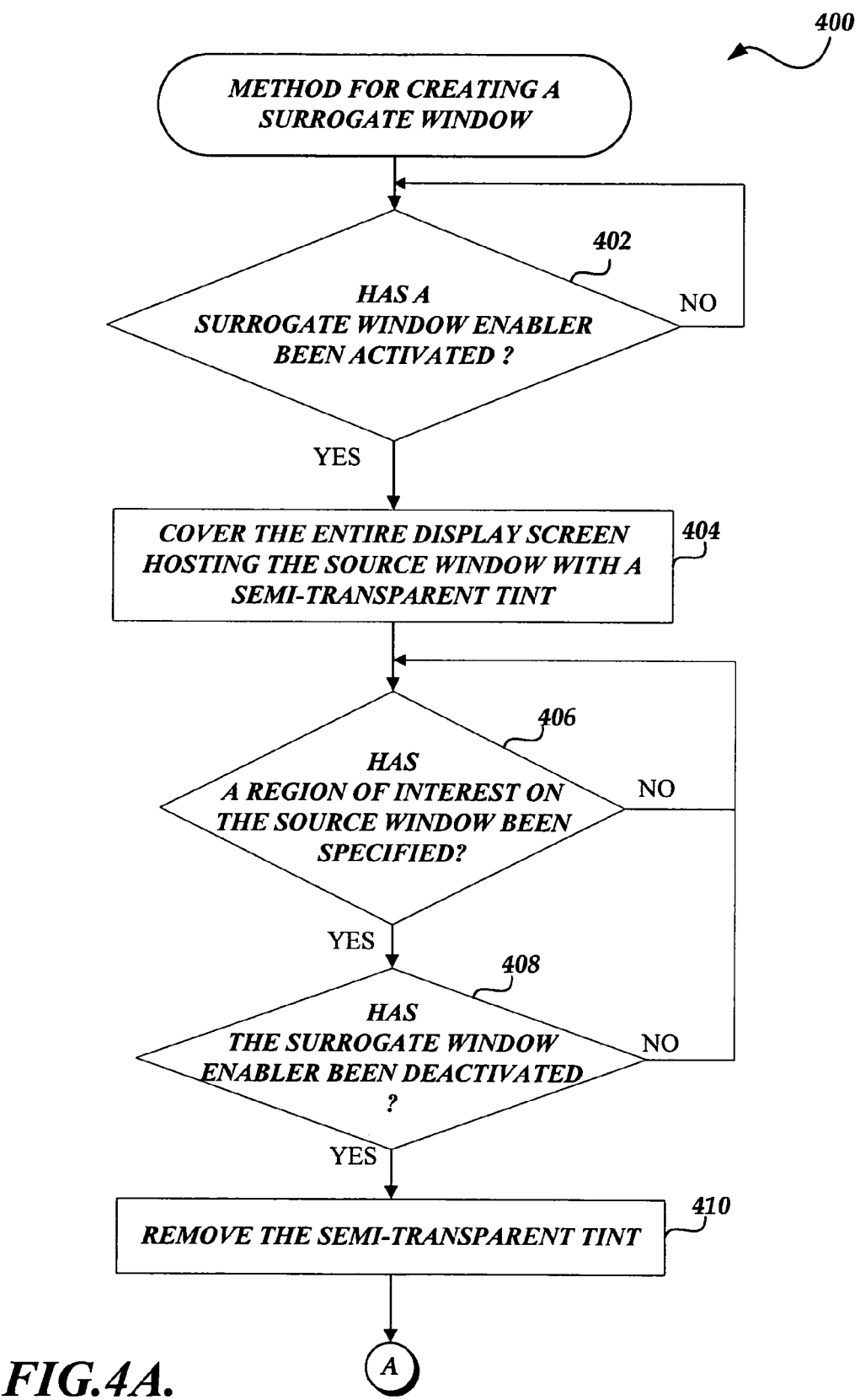
FIGS. 4A-4B are process diagrams illustrating an exemplary method of creating a surrogate window.
Figure 4B:
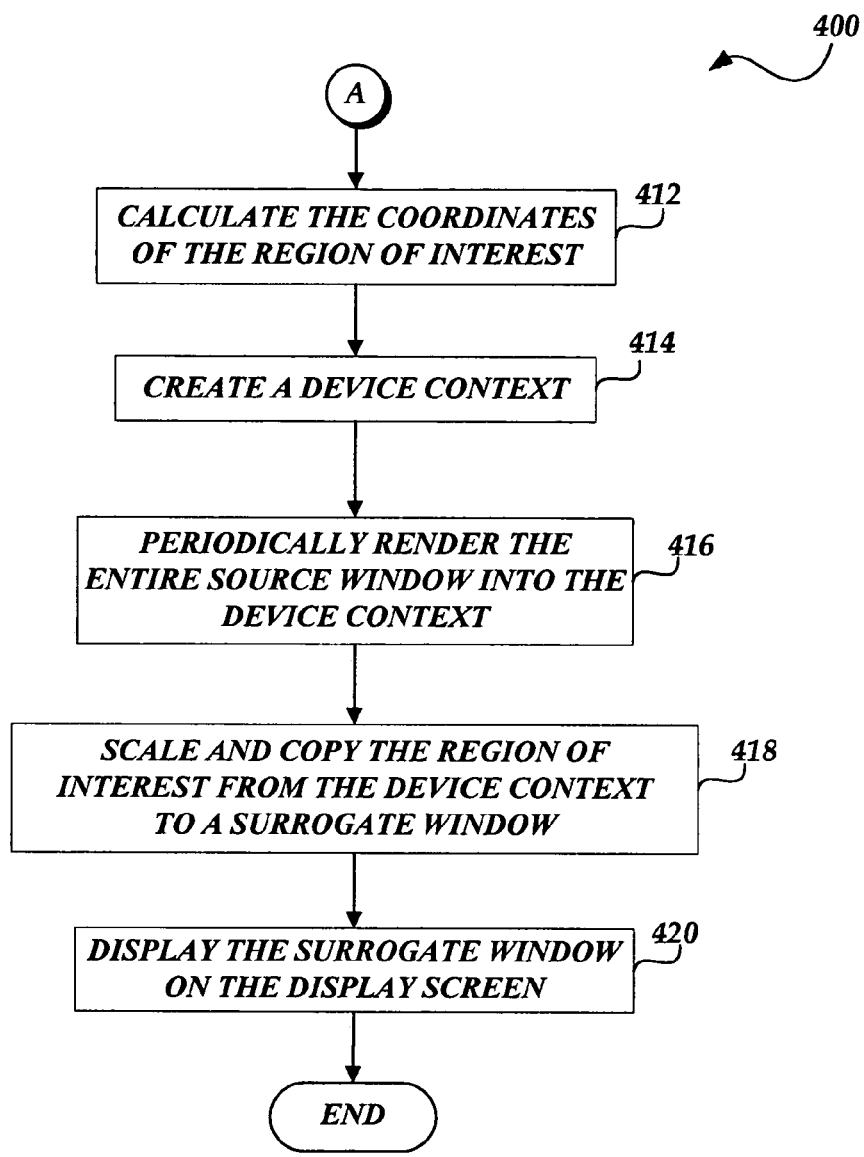

FIGS. 4A and 4B illustrate an exemplary method 400 for creating a surrogate window containing a region of interest in a source window. The method 400 first checks to determine if a surrogate window enabler has been activated by a user. See decision block 402. If the answer is NO, the method 400 does not proceed until the answer becomes YES. Alternatively, rather than remaining in a loop, the processing ends if the answer is NO. When the answer to decision block 402 becomes YES, meaning that a surrogate window enabler has been activated, the method 400 proceeds to cover the entire display screen hosting the source window with a semi-transparent tint. See block 404. The method 400 then proceeds to check if a region of interest in the source window has been specified. See decision block 406. If the answer is NO, the method 400 does not proceed until the answer becomes YES. Alternatively, rather than remaining in a loop, the processing ends if the answer is NO. When the answer to decision block 406 becomes YES, meaning that a user has specified a region of interest in the source window, the method 400 proceeds to determine if the activated surrogate window enabler has been deactivated by the user. See decision block 408. If the answer is NO, a user can continue to define a region of interest in the source window. The method 400 loops back to decision block 406 to check if a user has finished defining a region of interest in the source window. If the answer to decision block 408 is YES, meaning the activated surrogate window enabler has been deactivated, the method 400 proceeds to remove the semi-transparent tint from the display screen. See block 410. The method 400 then shifts to FIG. 4B, through terminal A.

From terminal A (FIG. 4B), the method 400 proceeds to calculate the coordinates of the region of interest that has been specified by the user. See block 412. The method 400 then proceeds to create a device context. See block 414. A device context is a structure that defines graphical objects and their associated attributes, and the graphical mode that affects output. A device context for a display supports drawing operations on a display screen. The method 400 periodically renders the entire source window into the device context. See block 416. In an alternative embodiment of the present invention, only the region of interest is rendered into the device context. The method 400 then scales and copies the region of interest from the device context to a surrogate window. See block 418. The method 400 then displays the surrogate window on the display screen. See block 420. Then, the method 400 ends. In one exemplary embodiment of the present invention, the image of the surrogate window is periodically refreshed.

FIG. 5 illustrates a method for sharing a surrogate window with a remote computer. The method 500 starts by determining whether a user has selected to share the surrogate window. See decision block 502. If the answer is NO, the method 500 does not proceed until a user has selected to share a surrogate window. Alternatively, rather than remaining in a loop, the processing ends if the answer is NO. When the user selects to share a surrogate window, for example, by selecting a "share" icon in a menu item of the surrogate window, the method 500 proceeds to display a dialog box for the user to specify a remote computer with which the surrogate window should be shared. Alternative embodiments of the present invention allow a user to specify the name and/or IP address of the remote computer. See block 504. After the remote computer is specified, the method 500 proceeds to send an image of the device context for the source window over the network to the remote computer. See block 506. The method 500 then proceeds to send the corresponding region of interest coordinates so that a surrogate window containing the region of interest can be created on the remote computer. See block 508. The method 500 proceeds to display the surrogate window on the remote computer. See block 510. Then the method 500 ends. In one embodiment of the present invention, coordinates of additional regions of interests, along with the name of the associated device context, may be sent over the network to the remote computer to create subsequent remote surrogate windows.

Figure 6:
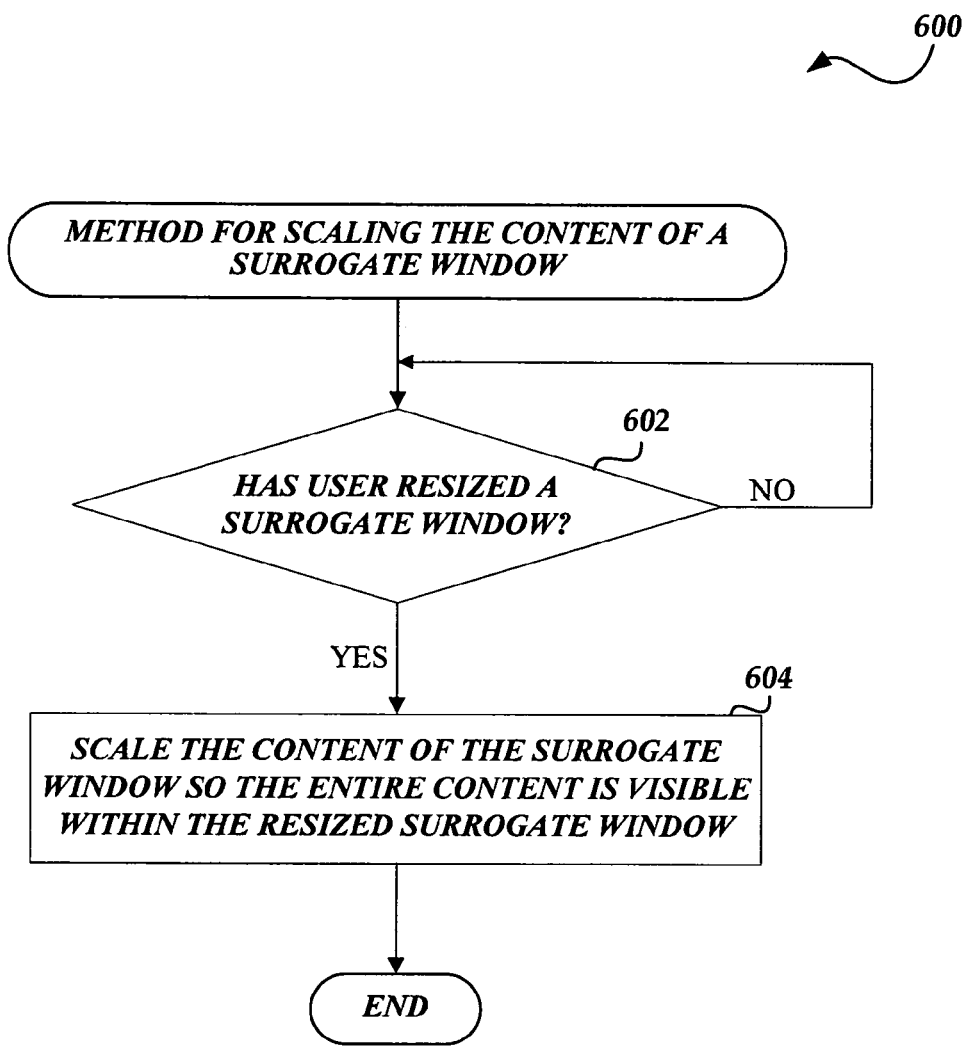
FIG. 6 is a process diagram illustrating an exemplary method of scaling content in a surrogate window in response to receiving an instruction to resize the surrogate window.

FIG. 6 illustrates an exemplary method 600 for scaling the content of a surrogate window when it is resized. The method 600 starts by determining whether a user has resized a surrogate window. See decision block 602. If the answer is NO, the method 600 does not proceed until a user has resized the surrogate window. Alternatively, rather than remaining in a loop, the processing ends if the answer is NO. If the answer is YES, the method 600 proceeds to scale the content of the surrogate window so that the entire content remains visible in the resized surrogate window. See block 604. The method 600 ends here.

FIG. 7 illustrates an exemplary method 700 for managing a remote surrogate window from its source computer, i.e., the computer that hosts the source window of the remote surrogate window. The method 700 first checks whether a user has requested to manage a remote surrogate window from the source computer. See decision block 702. If the answer is NO, the method 700 does not proceed until a user has issued such a request. Alternatively, rather than remaining in a loop, the processing ends if the answer is NO. One exemplary way for a user to issue such a request is to activate, for example, a hot key that has been configured to initiate a program implementing an input redirection mechanism. Such a program may redirect the input stream over the network so that a user can use input devices such as a mouse and keyboard connected to one computer to control the input on another computer. Consequently, if the answer to decision block 702 is YES, the method 700 proceeds to enable the user to control the input on the remote computer by using input devices connected to the source computer. See block 704. The method 700 then proceeds to check whether the user has issued any input instruction on the source computer. See decision block 706. If the answer is YES, the method 700 proceeds to execute the input instruction on the remote surrogate window. See block 708. For example, under the method 700, when a user actuates the "close" button of the surrogate window on the source computer, a close-window instruction is executed on the remote surrogate window to cause the closing of the remote surrogate window. From block 708, the method 700 loops back to decision block 706 to check whether there is another input instruction issued from the source computer. If the answer to decision block 706 is NO, the method 700 proceeds to check if the user has requested to end the management of remote surrogate window from the source computer. See decision block 710. If the answer is NO, the method 700 loops back to decision block 706 and waits for the next input instruction. If the answer is YES, meaning the user has requested to terminate the management of the remote surrogate window, the method 700 ends.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for managing arbitrary regions of a window on one or more display screens, comprising:
   in response to a user enabling surrogate window selection, identifying by use of a graphical pointing device a region of interest in a source window, the region of interest having a smaller area than the source window and has content that is dynamically changeable by the user displayed on the one or more display screen, creating for display a separate local surrogate window that the user may interact with containing the region of interest by:
     creating a device context;
     rendering exactly the contents of source window into the device context;
     copying the region of interest from the device context to the local surrogate window, the local surrogate window containing only the region of interest;
   duplicating the local surrogate window as a read-only remote surrogate window at a different network location specified by a user upon selection by the user to share the region of interest;
   updating content in the surrogate windows to keep the content consistent with content in the region of interest in the source window by:
     periodically rendering the contents of the source window into the device context;
     copying the region of interest from the device context to the surrogate windows; and
   providing a common visual space for display of multiple remote surrogate windows originating from respective source windows of different remote network locations.

2. The method of claim 1, further comprising:
   in response to activating a surrogate window enabler, enabling the user to start defining the region of interest; and
   in response to deactivation of the surrogate window enabler, stopping the enablement of the user to define the region of interest.

3. The method of claim 2, wherein the surrogate window enabler comprises a predefined keyboard modifier combination.

4. The method of claim 2, wherein the surrogate window enabler comprises a menu item.

5. The method of claim 2, wherein the surrogate window enabler comprises a list containing available source windows on the display screen.

6. The method of claim 1, further comprising:
   in response to receiving an instruction to resize the local surrogate window, scaling entire content of the local surrogate window so that the entire content remains visible.

7. The method of claim 1, further comprising:
   in response to receiving an instruction to be executed on the local surrogate window, executing the instruction on the local surrogate window; and
   also updating the remote surrogate window to reflect changes that resulted from executing the instruction on the local surrogate window.

8. The method of claim 1, further comprising:
   in response to receiving an instruction to manage the remote surrogate window from a source computer coupled to the display of the one or more display screen containing the source window, enabling the remote surrogate window to be managed from the source computer; and
   in response to an input instruction on the source computer, executing the input instruction on the remote surrogate window.

9. The method of claim 1, further comprising:
   in response to receiving an instruction to resize the remote surrogate window, scaling entire content of the remote surrogate window so that the entire content remains visible.

10. A computer-readable medium having computer-executable instructions for managing arbitrary regions of a window on one or more display screens of a computer system that when executed, comprise:
    in response to a user activating the surrogate window enabler, identifying by the use of a graphical pointing device a region of interest of a source window on the one or more display screen, the region of interest having a smaller area than the source window and has content that is dynamically changeable by the user and creating a separate read-only local surrogate window for display that the user may interact with, containing the region of interest by:
      creating a device context;

rendering exactly the contents of source window into the device context;

copying the region of interest from the device context to the local surrogate window, the local surrogate window containing only the region of interest;

reproducing the local surrogate window as a read-only remote surrogate window at one or more user specified remote network locations upon the user electing to share the region of interest;

updating content in the surrogate windows to keep the content consistent with content in the region of interest in the source window by:

periodically rendering the contents of source window into the device context;

copying the region of interest from the device context to the surrogate windows; and rendering a common display of a plurality of remote surrogate windows originating from respective source windows from various remote network locations.

11. The computer-readable medium of claim 10, further comprising:

in response to activating a surrogate window enabler, enabling the user to start defining the region of interest; and in response to deactivation of the surrogate window enabler, stopping the enablement of the user to define the region of interest.

12. The computer-readable medium of claim 11, wherein the surrogate window enabler comprises a predefined keyboard modifier combination.

13. The computer-readable medium of claim 11, wherein the surrogate window enabler comprises a menu item.

14. The computer-readable medium of claim 11, wherein the surrogate window enabler comprises a list containing available source windows on the one or more display screen.

15. The computer-readable medium of claim 10, further comprising:

in response to receiving an instruction to resize the local surrogate window, scaling entire content of the local surrogate window so that the entire content remains visible.

16. The computer-readable medium of claim 10, further comprising:

in response to receiving an instruction to be executed on the local surrogate window, executing the instruction on the local surrogate window; and also updating the remote surrogate window to reflect changes resulted from executing the instruction on the local surrogate window.

17. The computer-readable medium of claim 10, further comprising:

in response to receiving an instruction to manage the remote surrogate window from a source computer containing the source window, enabling the remote surrogate window to be managed from the source computer; and in response to an input instruction on the source computer, executing the input instruction on the remote surrogate window.

18. The computer-readable medium of claim 10, further comprising:

in response to receiving an instruction to resize the remote surrogate window, scaling entire content of the remote surrogate window so that the entire content remains visible.

19. A computer system for managing arbitrary regions of a window display on one or more display screens, comprising:

a display device displaying a source window; and a rendering component that renders for display a separate read-only local surrogate window, when surrogate window selection is enabled, from an arbitrary user defined region of the source window through the use of a graphical pointing device, the separate local surrogate window replicates contents of the arbitrary user defined region of the source window and any change to the contents of the source window is replicated as content in the local surrogate window, the user may interact with the separate local surrogate window and the source window, the separate local surrogate window is created having the region of interest of the source window by:

creating a device context, rendering exactly the contents of source window into the device context, and copying the region of interest from the device context to the local surrogate window, the local surrogate window having only the region of interest;

and is updated by:

periodically rendering the contents of the source window into the device context and copying the region of interest from the device context to the local surrogate window and is duplicated to create a remote surrogate window by:

rendering a duplicate of the local surrogate window on a user specified remote network location in response to the user electing to share the region of the local surrogate window; and a common visual space to render more than one remote surrogate window originating from respective source windows from more than one remote location.

20. The system of claim 19, further comprising a keyboard and wherein the rendering component is coupled to the keyboard for:

enabling the user to define the region of interest when a surrogate window enabler is activated; and preventing a user from further defining the region of interest when the surrogate window enabler is deactivated.

21. The system of claim 20, wherein the surrogate window enabler comprises a predefined keyboard modifier combination.

22. The system of claim 20, wherein the surrogate window enabler comprises a menu item implemented by computer-executable instructions stored on a computer-readable medium.

23. The system of claim 20, wherein the surrogate window enabler comprises a list containing available source windows, the list being storable on a computer-readable medium as a data structure.

24. The system of claim 19, wherein the rendering component scales entire content of the local surrogate window so that the entire content remains visible, in response to receiving an instruction to resize the local surrogate window.

25. The system of claim 19, further comprising a network for:

duplicating the local surrogate window to form a read-only remote surrogate window on a user defined remote display screen via the network; and also updating content of the remote surrogate window via the network to keep the content consistent with content in the region of interest in the source window.

26. The system of claim 25, wherein the rendering component updates the remote surrogate window with changes resulting from executing an instruction on the local surrogate window.

27. The system of claim 25, wherein the remote surrogate window is rendered on the remote display screen via user specified name or user specified IP address.

28. The system of claim 25, wherein the entire content of the remote surrogate window is scaled so that the entire content remains visible, in response to receiving an instruction to resize the remote surrogate window.

* * * * *